(12) United States Patent
Wang et al.

(10) Patent No.: US 9,025,517 B2
(45) Date of Patent: May 5, 2015

(54) FLEXIBLE WAYS TO INDICATE DOWNLINK/UPLINK BACKHAUL SUBFRAME CONFIGURATIONS IN A RELAY SYSTEM

(75) Inventors: Haiming Wang, Beijing (CN); Jing Han, Beijing (CN)

(73) Assignee: Nokia Coporation, Espoo (FI)

( * ) Notice: Subject to any disclaimer, the term of this patent is extended or adjusted under 35 U.S.C. 154(b) by 108 days.

(21) Appl. No.: 13/390,510

(22) PCT Filed: Jul. 13, 2010

(86) PCT No.: PCT/IB2010/053208
§ 371 (c)(1),
(2), (4) Date: Feb. 14, 2012

(87) PCT Pub. No.: WO2011/018722
PCT Pub. Date: Feb. 17, 2011

(65) Prior Publication Data
US 2012/0147810 A1    Jun. 14, 2012

Related U.S. Application Data

(60) Provisional application No. 61/234,207, filed on Aug. 14, 2009.

(51) Int. Cl.
| | |
|---|---|
| *H04B 7/212* | (2006.01) |
| *H04W 4/00* | (2009.01) |
| *H04W 24/02* | (2009.01) |
| *H04B 7/26* | (2006.01) |
| *H04W 16/26* | (2009.01) |
| *H04W 28/06* | (2009.01) |
| *H04W 84/04* | (2009.01) |

(52) U.S. Cl.
CPC ............. *H04W 24/02* (2013.01); *H04B 7/2606* (2013.01); *H04W 16/26* (2013.01); *H04W 28/06* (2013.01); *H04W 84/047* (2013.01)

(58) Field of Classification Search
USPC .................................. 370/321, 328, 337, 347
See application file for complete search history.

(56) References Cited

U.S. PATENT DOCUMENTS

| | | | |
|---|---|---|---|
| 2010/0103860 A1* | 4/2010 | Kim et al. ..................... | 370/315 |
| 2011/0013613 A1* | 1/2011 | Sung et al. .................... | 370/338 |
| 2012/0026935 A1* | 2/2012 | Park et al. ..................... | 370/315 |

(Continued)

FOREIGN PATENT DOCUMENTS

CN      101466105 A    6/2009

OTHER PUBLICATIONS

TSG-RAN WG1 Meeting #56, R1-091112, "Text proposal on type 1 relaying", Ericsson, Feb. 9-13, 2009.

(Continued)

*Primary Examiner* — Andrew Lee
(74) *Attorney, Agent, or Firm* — Mintz Levin Cohn Ferris Glovsky and Popeo, P.C.

(57) ABSTRACT

Methods and apparatus, including computer program products, are provided for indicating the configuration of a subframe of a backhaul between a relay node and a base station. In one aspect there is provided a method. The method may include generating an indication of a configuration of a subframe of at least one of an uplink and a downlink of a backhaul and sending the indication to a relay node to configure transmission at the relay node. Related apparatus, systems, methods, and articles are also described.

16 Claims, 11 Drawing Sheets

(56) References Cited

U.S. PATENT DOCUMENTS

| | | | |
|---|---|---|---|
| 2012/0033603 A1* | 2/2012 | Seo et al. | 370/312 |
| 2012/0039232 A1* | 2/2012 | Kwon et al. | 370/312 |
| 2012/0069790 A1* | 3/2012 | Chung et al. | 370/315 |
| 2012/0069793 A1* | 3/2012 | Chung et al. | 370/315 |
| 2012/0108255 A1* | 5/2012 | Jo et al. | 455/450 |
| 2012/0207083 A1* | 8/2012 | Chen et al. | 370/315 |
| 2012/0263135 A1* | 10/2012 | Ahmadi | 370/329 |

OTHER PUBLICATIONS

3GPP TSG-RAN WG1 #56, R1-091124, "WF on Access-Backhaul partitioning of Relays", Nokia, Nokia Siemens Networks, Feb. 9-13, 2009.

3GPP TR 36.814, v1.0.0, "3rd Generation Partnership Project; Technical Specification Group Radio Access Network; Further Advancements for E-UTRA Physical Layer Aspects (Release 9)", Feb. 2009.

3GPP TS 36.331, V8.6.0, "3rd Generation Partnership Project; Technical Specification Gropu Radio Access Network; Evolved Universal Terrestrial Radio Access (E-UTRA) Radio Resource Control (RRC); Protocol specification (Release 8)", Jun. 2009.

3GPP TSG RAN WG1 meeting #57, R1-091807, "Consideration on FDD Type 1 Relay Frame Structure", Huawei, May 4-9, 2009.

3GPP TS 36.321, v8.6.0, "3rd Generation Partnership Project; Technical Specification Group Radio Access Network; Evolved Universal Terrestrial Radio Access (E-UTRA) Medium Access Control (MAC) protocol specification (Release 8)", Jun. 2009.

3GPP TSG RAN WG1 #57-bis, R1-092780, "Draft Text Proposal on Type I Relay UL Backhaul Subframes in LTE-A", CATT, CMCC, Huawei, ITRI, LGE, Motorola, Nokia, Nokia Siemens Networks, Potevio, Qualcomm, RITT, Samsung, Texas Instruments, ZTE, Jun. 29-Jul. 3, 2009.

3GPP TSG RAN WG1 #57, R1-091989, "DL and UL Backhaul Subframe Allocation for Type I Relay in LTE-A", CATT, CMCC, Potevio, May 4-8, 2009.

TSG-RAN WG1 #57bis, R1-092469, "Consideration on UL Backhaul Resource Configuration and Indication", ZTE, Jun. 29-Jul. 3, 2009.

3GPP TSG-RAN WG1#57bis, R1-092339, "The Benefits of One PA Mode for UEs Supporting Multiple PAs", Sharp, Jun. 29-Jul. 3, 2009.

\* cited by examiner

```
DL Backhaul Configuration IE (could be MBSFN-liked IE)

MBSFN-SubframeConfigList ::=    SEQUENCE (SIZE (1..maxMBSFN-Allocations)) OF MBSFN-SubframeConfig MBSFN-SubframeConfig ::=   SEQUENCE {
    radioframeAllocationPeriod      ENUMERATED {n1, n2, n4, n8, n16, n32},
    radioframeAllocationOffset      INTEGER (0..7),
    subframeAllocation              CHOICE {
        oneFrame                        BIT STRING (SIZE(6)),
        fourFrames                      BIT STRING (SIZE(24))}
}
```

FIG. 3

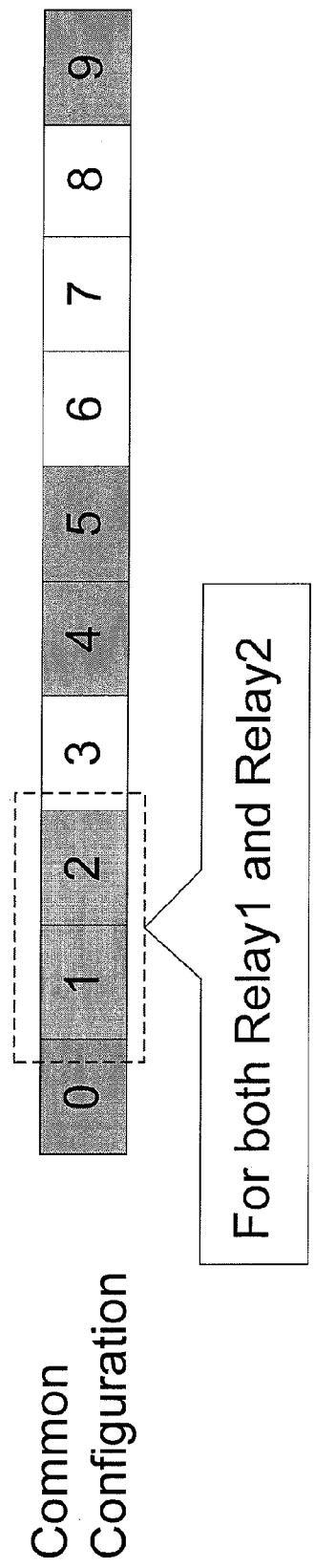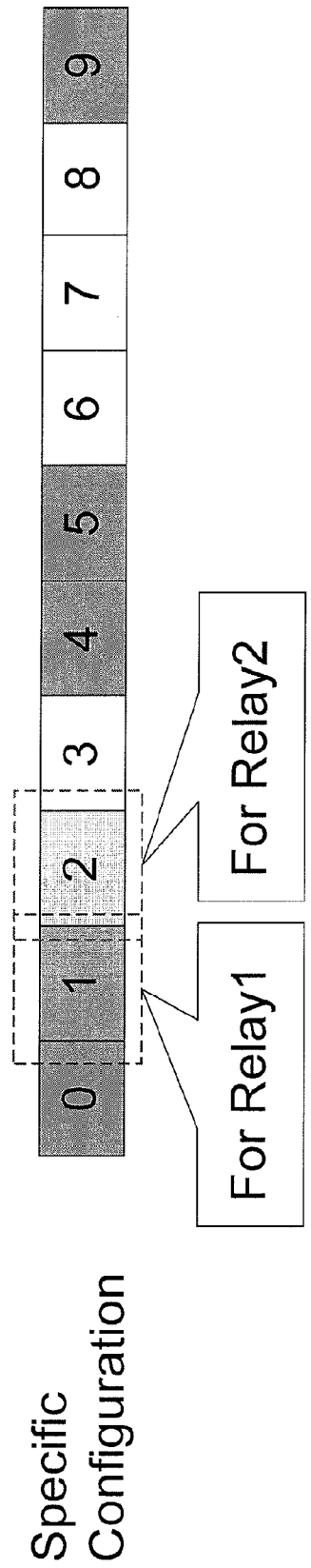
FIG. 4A
FIG. 4B

FLEXIBLE WAYS TO INDICATE DOWNLINK/UPLINK BACKHAUL SUBFRAME CONFIGURATIONS IN A RELAY SYSTEM

RELATED APPLICATION

This application was originally filed as PCT Application No. PCT/IB2010/053208 filed Jul. 13, 2010, which claims priority benefit to U.S. Provisional Patent Application No. 61/234,207, filed Aug. 14, 2009.

FIELD

The subject matter described herein relates to wireless communications.

BACKGROUND

Frequency Division Duplex (FDD) and Time Division Duplex (TDD) are common schemes used in wireless communication systems. FDD refers to using two distinct channels, such as two separate frequencies. For example, a first channel may be used for transmission in one direction from node A to node B, and a second channel may be used to support transmission from node B to node A. As this example illustrates, FDD may be used to simultaneously transmit and receive on two separate channels. In contrast to FDD, TDD uses a single channel, e.g., a single frequency, to support both transmission and reception. For example, a first channel may be used for transmission in one direction from node A to node B. To communicate from node B to node A, the same, first channel is used, which requires that node A cease any transmission on that channel before node B begins transmission. When a relay is used, a relay passes along information (e.g., data, signals, and the like) from one node to another node. For example, node B may act as a relay for node A, so that the signals of node A are passed to node B. In the case that node A is a base station, node B extends the coverage area of node A into node B. In some cases, communications between nodes A and B may be in accordance with a frame. A frame refers to a structure defining when communications take place and/or what the transmission includes.

SUMMARY

Methods and apparatus, including computer program products, are provided for indicating the configuration of a subframe of a backhaul between a relay node and a base station.

In one aspect there is provided a method. The method may include generating an indication of a configuration of a subframe of at least one of an uplink and a downlink of a backhaul and sending the indication to a relay node to configure transmission at the relay node.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 3 depicts a message, such as an information element, used to signal relay nodes;

FIGS. 4A and 4B depict examples of subframes;

DETAILED DESCRIPTION

The subject matter described herein relates to indicating the configuration of backhaul subframes between a base station and a relay station and, in some implementations, indicating the configuration of subframes carried on at least one of an uplink and a downlink between a base station, such as an evolved Node B base station, and a relay node.

Figure 1:
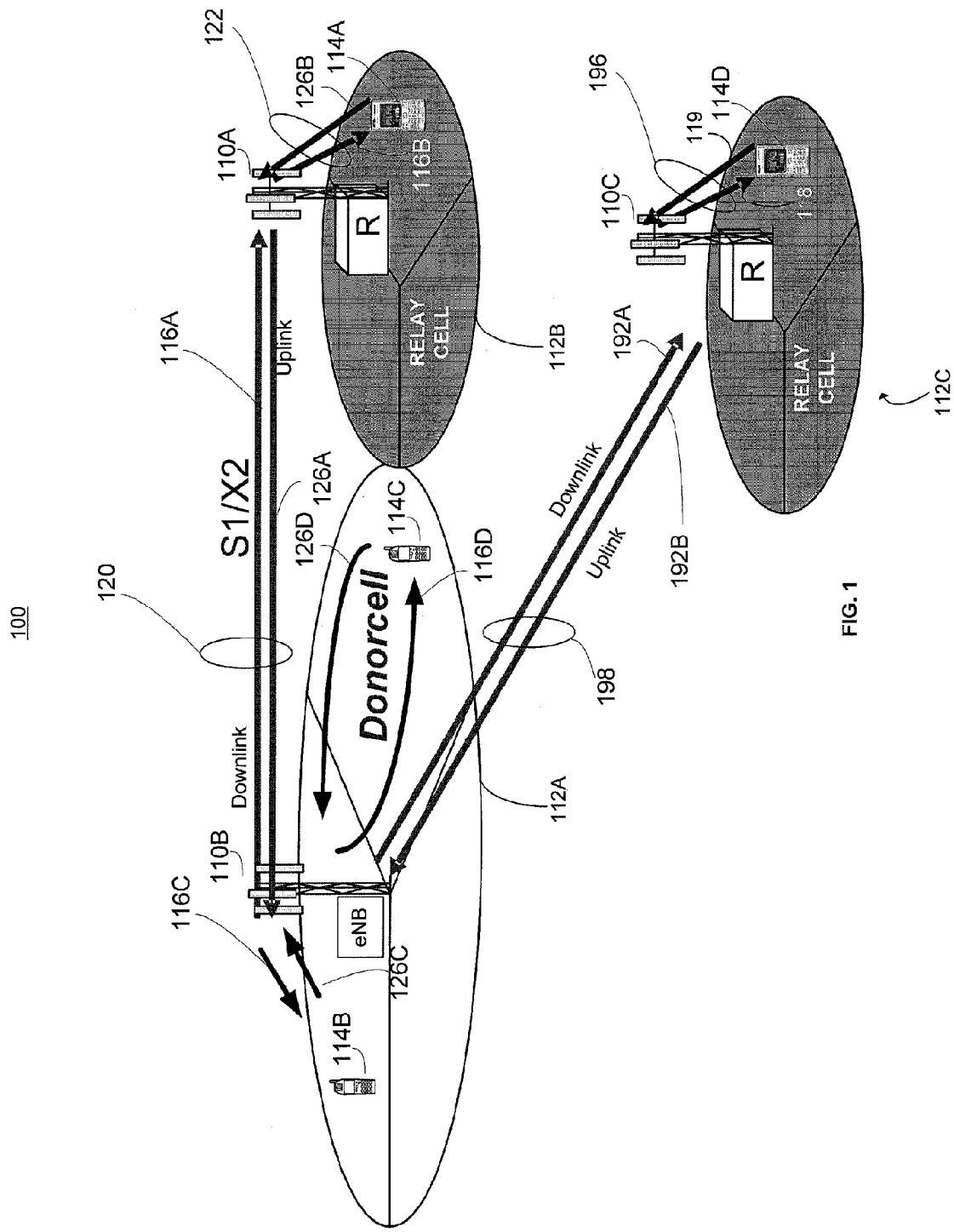
FIG. 1 depicts a block diagram of a wireless communication system with relay stations.

FIG. 1 is a simplified functional block diagram of a wireless communication system 100. The wireless communication system 100 includes a plurality of base stations 110A-C, each supporting a corresponding service or coverage area 112A-C (also referred to as a cell). The base stations 110A-C are capable of communicating with wireless devices within their coverage areas.

In some implementations, base stations 110A and 11C are implemented as a layer 3 (L3) relay for base station 110B, which may be implemented as an evolved Node B (eNB) type base station consistent with standards, including the Long Term Evolution (LTE) standards, such as 3GPP TS 36.201, "Evolved Universal Terrestrial Radio Access (E-UTRA); Long Term Evolution (LTE) physical layer; General description," 3GPP TS 36.211, "Evolved Universal Terrestrial Radio Access (E-UTRA); Physical channels and modulation," 3GPP TS 36.212, "Evolved Universal Terrestrial Radio Access (E-UTRA); Multiplexing and channel coding," 3GPP TS 36.213, "Evolved Universal Terrestrial Radio Access (E-UTRA); Physical layer procedures," 3GPP TS 36.214, "Evolved Universal Terrestrial Radio Access (E-UTRA); Physical layer—Measurements," and any subsequent additions or revisions to these and other 3GPP series of standards (collectively referred to as LTE standards). The base stations 110A-C may also be implemented consistently with the Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, IEEE 802.16m, Advanced Air Interface, and any subsequent additions or revisions to the IEEE 802.16 series of standards (collectively referred to as IEEE 802.16).

In some implementations, the wireless communication system 100 may include backhaul links, such as links 120 and 198, and relay access links, such as links 122 and 196. The backhaul links 120 are used between the base stations 110A-110B, while backhaul links 198 are used between base stations 110B and 110C. The backhaul links include a downlink, such as downlinks 116A and 192A, for transmitting from the base station 110B to base station 110A and base station 110C, and an uplink, such as uplinks 126A and 192B, for transmitting from base stations 110A and 110C to base station 110B. The relay access links 122 and 196 each include a downlink (e.g., downlink 116B and 118) for transmitting to the user equipment and an uplink (e.g., uplink 126B and 119) for transmitting from a user equipment to a base station. Although the base stations 110A and 110C are described as relay nodes and base station 110B is described as an eNB type base station, the base stations 110A-C may be configured in other ways as well and include, for example, cellular base station transceiver subsystems, gateways, access points, radio frequency (RF) repeaters, frame repeaters, nodes, and include access to other networks as well. For example, base station 110B may have wired and/or wireless backhaul links to other network elements, such as other base stations, a radio network controller, a core network, a serving gateway, a mobility management entity, a serving GPRS (general packet radio service) support node, and the like.

The user equipments 114A-D may be implemented as a mobile device and/or a stationary device. The user equipments 114A-D are often referred to as, for example, mobile stations, mobile units, subscriber stations, wireless terminals, or the like. A user equipment may be implemented as, for example, a wireless handheld device, a wireless plug-in accessory, or the like. In some cases, a user equipment may include a processor, a computer-readable storage medium (e.g., memory, storage, and the like), a radio access mechanism, and a user interface. For example, the user equipment may take the form of a wireless telephone, a computer with a wireless connection to a network, or the like. Although for simplicity only two base stations and three user equipments are shown, other quantities of base stations and user equipments may be implemented in wireless communication system 100.

In some implementations, the downlinks and uplinks each represent a radio frequency (RF) signal. The RF signal may include data, such as voice, video, images, Internet Protocol (IP) packets, control information, and any other type of information. When IEEE-802.16 and/or LTE are used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. Moreover, in some implementations, the wireless communication system 100 can be configured to comply substantially with a standard system specification, such as LTE or other wireless standards, such as WiBro, WiFi, IEEE 802.16, or it may be a proprietary system. The subject matter described herein is not limited to application to OFDMA systems, LTE, LTE-Advanced, or to the noted standards and specifications.

In some implementations, base station 110B may implement L3 relaying to enlarge the coverage area of base station 110B and cell 112A to include additional coverage areas, such as coverage areas 112B-C. L3 relaying may, in some implementations, improve capacity and/or improve cell edge performance. Referring to FIG. 1, when L3 relaying is implemented, base stations 110A and 110C (each labeled "R") are referred to as the L3 relay (or simply the "relay" or the "relay node"), and base station 110B is referred to as eNB (or the "donor cell" which is also referred to herein as "DeNB"). As used herein, the term "relaying" is used to refer to so-called "non-transparent relays" configured to perform layer three (L3) relaying at a base station, although other types of relaying (e.g., layer 1 or layer 2) may be used as well. As noted, in the implementation of FIG. 1, the base stations 110A and 110C are L3 relay nodes connected via backhaul links to base station 110B, which acts as a so-called "donor" cell providing access to the rest of the network and providing a larger coverage area, although other implementations may be used as well.

As noted, base station 110B may be implemented as an evolved node B (eNB) type base station with a large coverage area 112A providing wireless communications to one or more user equipments, such as user equipments 114B-C. Base station 110B may use backhaul links 120 and 198 to extend into coverage areas 112B-C (which may be referred to as relay cells or, more simply, cells) and to communicate with user equipments in those coverage areas 112B-C via relay access links 122 and 196.

Moreover, the uplinks and downlinks of the backhaul links and relay access links may be configured to have a frame structure, which is typically defined in a standard, such as IEEE 802.16, LTE, and the like. Moreover, the frame structure may include a subframe structure defining the uplinks and downlinks of the backhaul links. The subframe structure may take a variety of configurations, but the subframe structure typically defines what is transmitted when and, likewise, what is received and when. For example, the subframe structure may define the allocation (which may be in terms of time, blocks, symbols, OFDM symbols, or the like) to the uplink and downlink of the backhauls 120 and 198. The subframe structure (which may be part of an overall frame) may thus allow the downlink and the uplink of the backhaul to coordinate transmission when time division duplex (TDD) communications is used, avoiding simultaneous transmission, which in a TDD-based system is unacceptable. Moreover, the subframe structure may be pert of an overall frame which allocates when other links transmit and/or receive (e.g., relay access links, etc.).

As noted, the backhauls 120 and 198 each comprise an uplink and a downlink. Moreover, the backhauls 120 and 198 each have a subframe structure defining an uplink portion of the frame, a downlink portion of the frame, and the like. Likewise, the relay access links 122 and 196 each comprise an uplink and a downlink, and have a subframe structure defining an uplink portion of the frame, a downlink portion of the frame, and the like.

Relay nodes, such as relay nodes 110A and 110C, may provide a way to extend cell coverage and enhance cell capacity at a relatively low cost. Although there are various kinds of relay nodes which might be implemented, a so-called "type 1" relay node may be used as the baseline relay type in LTE-Advanced. The type 1 relay is an inband relay, which refers to a relay node in which the backhaul links and the relay access links share the same band. To that end, the backhaul links and the relay access links are time division multiplexed and have the same subframe structure. The cells within the coverage area of a type 1 relay node and an eNB may have the same radio resource management mechanisms and protocol stacks. Moreover, the cells controlled by the relay node may, in some implementations, be configured to support LTE Rel-8 user equipment (providing backward compatibility).

In some implementations, to fulfill the Rel8 user equipment compatibility, the multicast broadcast multimedia services single frequency network (MBSFN) subframe may be used to break a so-called "hole" for downlink backhaul transmission, so that during the MBSFN subframe, user equipment (e.g., user equipment 114A, 114D, etc.) controlled by the relay nodes do not expect to receive any data and CRS (cell-specific reference symbol) in the data zone from the relay node 110A. As such, the relay nodes 110A and 110C may use this hole, or gap, to receive signals from the donor eNB 110B (DeNB). The configuration signaling for the MBSFN subframe may be configured for the Rel8 specification, which achieves Rel8 user equipment compatibility. Furthermore, for uplink backhaul 126A transmission, the relay node 110A may use dynamic scheduling to prevent the user equipment 114A in the relay cell 112B from transmitting via the uplink 126B to relay node 110A (during which time the relay node is using the gap to transmit via uplink 126A to eNB 110B). Dynamic scheduling refers to a relay node which uses a scheduling method to prevent the user equipment from transmitting. Typically, the relay node may use the uplink grant to schedule the user equipment uplink transmission, and in backhaul subframe, the relay node may also be configured to not send the uplink grant to the user equipment (in which case the user equipment will not transmit via the uplink transmission).

The following provides example implementations of ways to indicate the configuration of subframes carried by the uplink and/or the downlink backhaul. In an implementation, the DeNB 110B may use so-called "relay common signaling", which is the signaling for all relays that attached to the same e-NB, to indicate the time-domain resources used by the downlink backhaul (e.g., the subframe configuration of downlinks 116A and 192A). This signaling could be carried by RRC signaling or contained in MAC Control Element (CE) that is scrambled by a common identifier (e.g., SI-RNTI (System Information-Radio Network Temporary Identity)), which is signaling that all relay nodes attached to the same e-NB can decode. The DeNB 110B may send relay common signaling information to reserve or semi-statically configure the subframes of the backhaul links 120 and 198 (and, in particular, downlinks 116A and 192A) used by all of the relay nodes, such as relay nodes 110A and 110C, coupled to (or controlled by) the same DeNB 110B.

In other implementations, the DeNB 110B may use so-called "relay specific signaling" (i.e. each relay has the corresponding signaling) to send information to specific relay nodes indicating the downlink backhaul subframe configuration (e.g., of downlinks 116A and 192A). This relay node specific signaling may be carried by, for example, higher-layer signaling, such as radio resource control (RRC) signaling, media access control (MAC) signaling, and the like.

In yet another implementation, the DeNB 110B may use so-called "group-based signaling" to indicate the downlink backhaul time-domain resources for the downlink backhaul subframe configuration of, for example, downlinks 116A and 192A. This "group-based signaling" could be carried by RRC signaling or contained in MAC CE that scrambled by group identifier. In this implementation, the DeNB 110B establishes groups of one or more relay nodes. In some cases, the grouping is established dynamically or semi-statically. For the relay nodes in each group, the relay nodes have the same downlink backhaul subframe configuration. The DeNB 110B may send the signaling information in a resource shared by all of the relay nodes, so that each of the relay nodes decodes its own signaling based on the group identifier information. For example, a relay node decodes and processes messages carrying a group identifier, when the relay node is a member of that group.

In another implementation, the DeNB 110B uses semi-persistent scheduling, which is configured as so-called "multiple-semi-persistent scheduling" and/or "multi-periodicity SPS," to configure the allocation of the subframes of the uplinks of the backhauls 120 and 198 (e.g., uplinks 126A and 192B). For multiple-SPS, one or multiple L1 control signaling channels (e.g., the relay PDCCH) are used to activate SPS patterns.

In yet another implementation, the DeNB 110B indicates in a bitmap the configuration of the subframes carried by the uplink backhauls (e.g., uplinks 126A and 192B). The bitmap is carried on a higher-layer signaling mechanism, such as the radio resource control (RRC), MAC control element (CE), and the like to indicate the subframe configurations of the uplinks of the backhaul.

Given the above general description, the following provides additional details regarding the above noted implementations of providing flexible ways to indicate subframe configurations of the uplink and/or downlink between a base station, such as DeNB, and one or more relay nodes, such as relay nodes 110A and 110C, when the backhaul links 120 and 198 and relay access links 122 and 196 share the same band (and are thus time division multiplexed).

In implementations using relay common signaling to indicate the subframe configuration of the downlink backhaul (e.g., links 116A and 192A), a relay node common signaling zone is defined to carry information representative of the relay node common allocation signaling. This relay node common allocation signaling indicates the subframe configuration of the downlink backhaul. Moreover, the relay node common allocation signaling is sent by DeNB 110B and received by all of the relay nodes 110A and 110C, which are coupled, or controlled by, the same DeNB 110B. This relay common allocation signaling may be located in a portion of the subframe of the downlink backhauls 116A and 192A.

Figure 2:
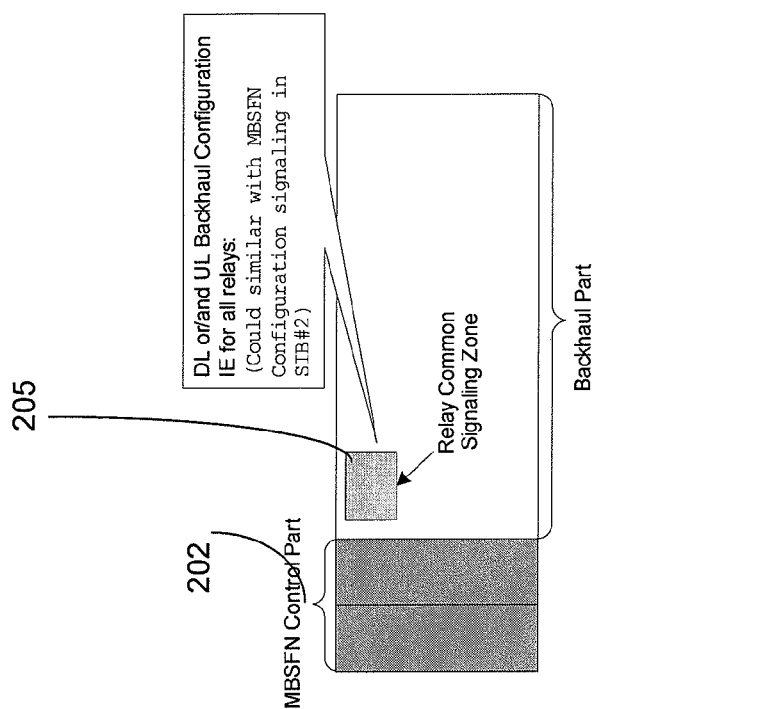
FIG. 2 depicts an example of a subframe structure including a common zone used to signal relay nodes.

FIG. 2 depicts an example of a subframe frame structure including a MBSFN control portion of the frame 202 and a relay node common signaling zone 205. The relay node common signaling zone 205 may be configured as information elements (IE) transmitted by the DeNB 110B to one or more relay nodes, such as relay nodes 110A and 110C. The format of the signaling may be compatible with the MBSFN configuration information in the Rel8 specification.

The relay common allocation signaling 205 may be defined to be carried via a relay physical broadcast channel (R-PBCH) and at, for example, a first available control OFDM symbol after the relay node switches to a receive mode from a transmit mode. The relay node common signaling may appear periodically to indicate the MBSFN allocation for all the relay nodes. In some implementations, the relay common signaling zone 205 may reduce the amount of signaling overhead as only one signal (e.g., a message which is broadcast) is needed for all relay nodes that are attached to the same DeNB, but on the other hand, all of the relay nodes in the same DeNB have the same downlink backhaul subframe configuration, which may in some circumstance contribute to wasted resources.

In implementations using the relay specific signaling noted above, the DeNB 110B may send a message to a specific relay node to indicate the subframe configuration of the downlink backhaul (e.g., links 116A and 192A). For example, DeNB 110B may send relay specific signaling as a message carried by RRC signaling or MAC control protocol data unit (PDU)

for each relay node via the R-PDSCH. The format of the relay specific signaling may be compatible with the MBSFN configuration information element used in the Rel8 specification. FIG. 3 depicts an example information element (IE) sent by DeNB 110B via RRC signaling or MAC control protocol data unit (PDU) to a specific relay node to indicate the subframe configuration of a downlink backhaul link. For example, DeNB 110B may send the subframe configuration of downlink backhaul link 116A to relay node 110A, and send the subframe configuration of downlink backhaul link 192A to relay node 110C.

Implementations using relay specific signaling might result in large signaling overhead as the DeNB 110B separately sends specific signaling information to each relay node. This may be particularly bothersome given the case that many of the relay nodes share a common downlink backhaul subframe configuration. In some cases, the relay specific signaling may provide the advantage of different downlink backhaul subframe configurations being used by different relay nodes, which enhances flexibility and in some instances saves resources for the access link. For example, assuming the case that one subframe is needed for relay node 110A downlink backhaul and one subframe is needed for the downlink backhaul of relay node 110C, common signaling would result in two downlink subframes for both relay nodes 110A and C (as the common signaling cannot distinguish between the two relay nodes). FIG. 4A depicts subframes 1 and 2 allocated to both relay nodes 110A and C. Moreover, these two subframes 1 and 2 would not be available for use by the access links. On the other hand, when using relay specific signaling configuration, only one downlink backhaul subframe is required for each of the relay nodes 110A and C, as depicted at FIG. 4B. Thus in the relay specific signaling configuration, only one subframe is unavailable for the access link from each of the relay nodes 110A and C, and one subframe is saved for the access link, when compared to the common relay signaling.

In some implementations, the relay nodes 110A and 11C coupled (or controlled by) the same DeNB 110B are grouped into one or more groups. For example, relay nodes 110A and C may be grouped as both relay nodes 110A and C are relays of DeNB 110B. Moreover, in some implementations, the DeNB 110B may establish the groups of relay nodes dynamically or semi-statically. The relay nodes of a given group are configured with the same subframe configuration for the downlink backhaul (e.g., links 116A and 192A).

The relay nodes may be identified with a relay identifier. Moreover, the groups may be identified with a group identifier. For example, the DeNB 110B may include in a subframe configuration signaling message the relay node identifier. Moreover, the DeNB 110B may also include the group identifier in those signaling messages.

For example, in the case of dynamic grouping, the relay identifier (which identifies a given relay node) may be included in the signaling message sent from the DeNB 110B to the relay node to indicate the subframe configuration of the downlink backhaul (e.g., links 116A and 192A). The relay identifier is used by the relay node to recognize that the subframe configuration is for the relay node and not another node. In the case of semi-static grouping, the group identifier (which identifies a given group of relay nodes) may be included in the signaling message sent from the DeNB 110B to the relay nodes to indicate the subframe configuration of the downlink backhaul (e.g., links 116A and 192A), enabling the nodes in the group to recognize that the subframe configuration is for the group and not another group.

In some implementations, the relay common signaling zone 205 (which is broadcast by DeNB 110B) may include a group identifier and signaling information for the identified group, sharing thus the group identifier and signaling information among the relay nodes. Moreover, each relay node may decode and process its own signaling based on the relay identifier and/or group identifier. As noted, the relay identifier and/or group identifier may be included in signaling messages sent from the DeNB 110B to the relay nodes 110A and 110C (e.g., in the header of the signaling message).

Group based signaling may be implemented in a variety of ways, although the following provides specific examples of dynamic grouping and semi-static grouping schemes. In the case of dynamic grouping, if the relay node's downlink traffic varies relatively fast, then the DeNB 110B may be configured to dynamically change the downlink backhaul subframe configurations for the relay nodes. In dynamic grouping, the DeNB 110B dynamically groups the relay nodes according to the traffic level of the relay nodes, although other factors and/or information may be used as well to dynamically group the relay nodes.

Figure 5:
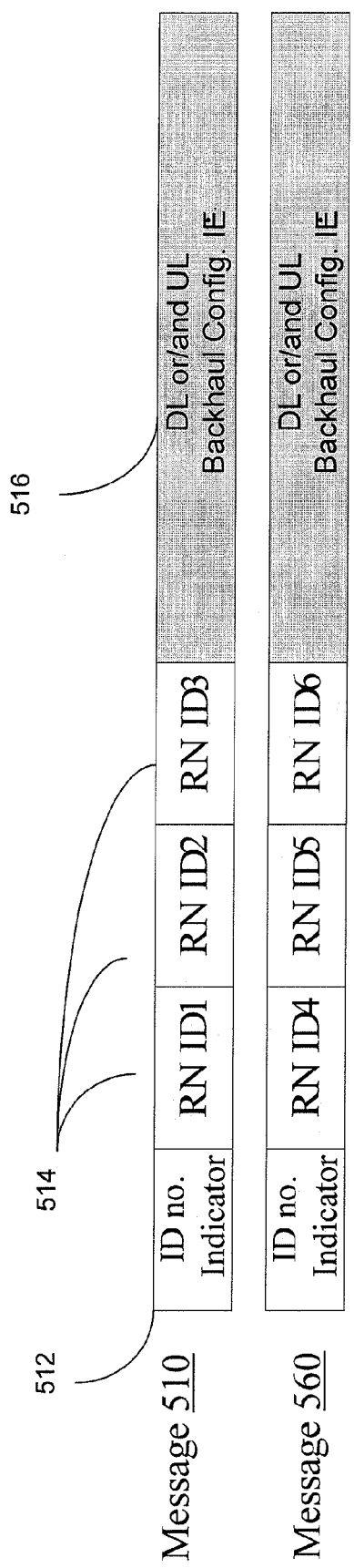
FIG. 5 depicts an example of the signaling format for dynamic group-based signaling.

FIG. 5 depicts an example of the signaling format for dynamic group-based signaling. Referring to FIG. 5, a DeNB may send a first group of relay nodes message 510. The message 510 may include a group identifier 512 and relay nodes identifiers 514 to identify the relay nodes of the first group. The message may also include an information element 516 for the downlink backhaul subframe configuration, which could be compatible with the MBSFN configuration information element or use a bitmap signaling mechanism (e.g., the bitmap described herein). The DeNB 110B may send message 560 to a second group of relay nodes.

In the case of static grouping, if a plurality of the relay nodes have downlink backhaul subframe configurations which vary slowly, the DeNB 110B may semi-statically configure the subframe configuration of the relay downlink backhaul (e.g., links 116A and 192A). In this scheme, the relay nodes 110A and 110C are grouped within pre-defined groups. The specific relay nodes 110A and 110C are assigned to a group semi-statically, and configured by the DeNB 110B, less frequently when compared to the dynamic grouping scheme. The dynamic grouping scheme generally refers to relays nodes that belongs to the same group (which are frequently changed), so the relay node decodes the signaling (e.g., of FIG. 5) to determine which group it belongs to. In contrast, the semi-static grouping scheme refers to the relay nodes which belong to a group which is does not change (or changes relatively slowly or infrequently), such that the relay node maintains a group identifier indicated by the eNB, and uses the group identifier to decode the signaling (e.g., of FIG. 6). The DeNB 110B may also configure the relay nodes of a group based on the averaged cell traffic information of the relay node(s). The relay identifier and/or group identifier may be included in signaling messages sent from the DeNB 110B to the relay nodes 110A and 110C (e.g., in the header of the signaling message).

Figure 6:
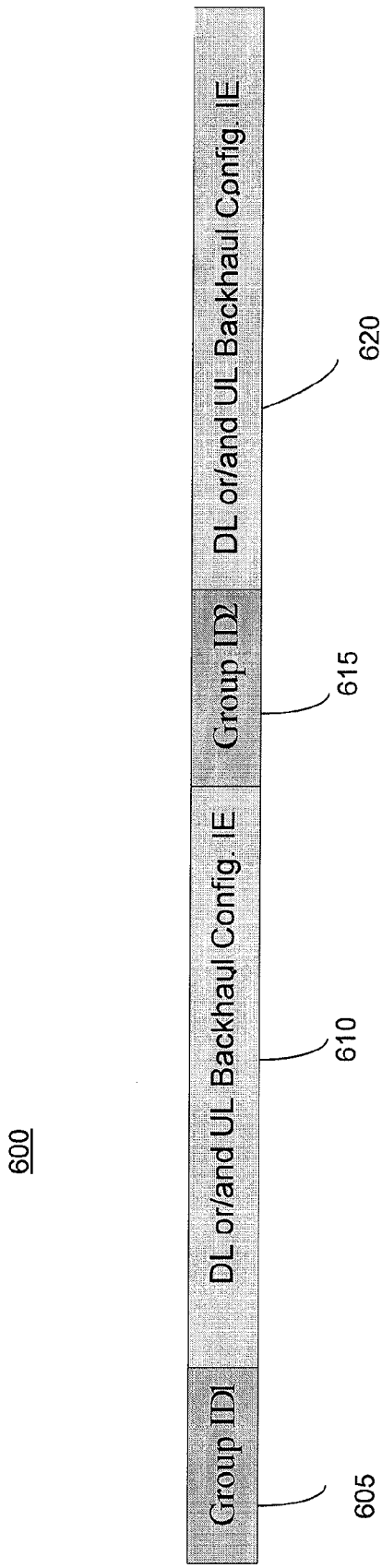
FIG. 6 depicts an example of the signaling format of a message 600 used for the semi-static group-based signaling.

FIG. 6 depicts an example of the signaling format of a message 600 used for the semi-static group-based signaling. The message 600 includes group identifiers 605 and 615 and configuration information 610 and 620. In this case, the relay node belongs to a group which is not changed or slowly changed (or, e.g., infrequently), and the relay node thus maintains a group identifier (e.g., 605 and 615) indicated by eNB, and uses the group identifier to decode or find the configuration information elements 610 or 620 in the signaling. The configuration information elements 610 or 620 will indicate relays of the backhaul subframe configuration.

In some implementations, the group based signaling scheme described herein may provide the advantage of having more subframe configuration allocation flexibility, when compared to relay common signaling, and saving signaling overhead when compared to relay specific signaling.

The following describes two implementations which can be used to flexibly identify the uplink backhaul subframe configuration (e.g., links 126A and 192B). To flexibly identify the uplink backhaul subframe configurations, multiple SPS or multi-periodicity SPS may be used to indicate the uplink subframe configurations for the relay nodes. SPS is a scheduling method which reserves a series of time-frequency resource for the user equipment initial transmission, in which e-NB does not need to use a downlink assignment or an uplink grant to schedule user equipment's initial transmission.

In the case of the multiple SPS procedure, multiple SPS patterns are pre-configured, and the information of the SPS patterns for each relay node are signaled by DeNB 110B to the relay nodes 110A and 110C via RRC signaling. The DeNB 110B also uses the R-PDCCH to activate multiple SPS patterns. For the relay nodes 110A and 110C, these multiple SPS patterns are interpreted as preserved time-domain resources for uplink backhaul transmission.

Figure 7A:
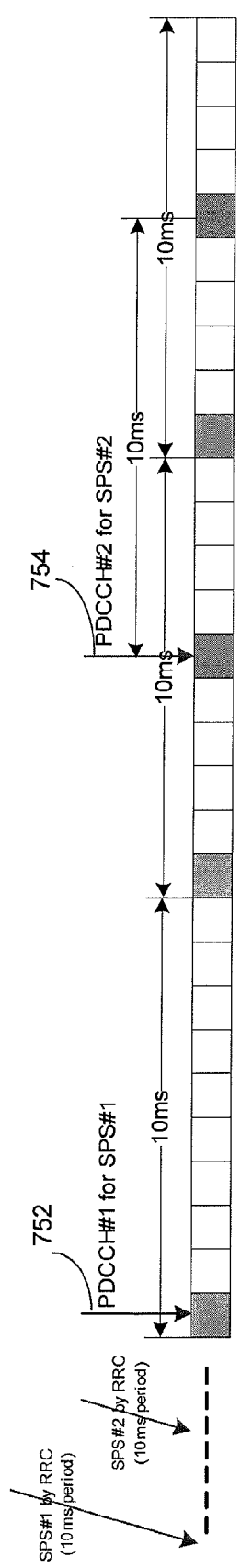
FIGS. 7A-B depict two alternative ways to activate the multiple SPS patterns for the relay node.
Figure 7B:
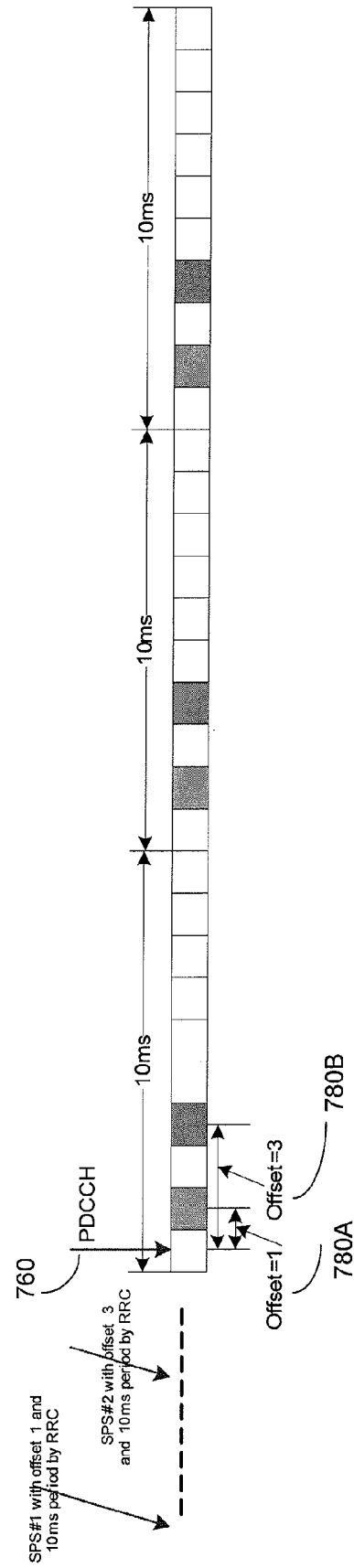

FIGS. 7A-B depict two alternatives ways to activate the multiple SPS patterns. Referring to FIG. 7A, for each SPS pattern, one R-PDCCH from the DeNB to the relay node is used to activate SPS scheduling. For example, in FIG. 7A, the first R-PDCCH 752 is used to activate the first SPS pattern, and the second R-PDCCH 754 is used to activate second SPS pattern. The relay node may thus interpret the combined SPS pattern as the preserved resource for the uplink backhaul transmission. The SPS related information (e.g. periodicity for these SPS patterns) is signaled by RRC.

Referring to FIG. 7B, after a relay node receives from the DeNB the last SPS pattern via RRC signaling, one R-PDCCH 760 is used to activate all the SPS scheduling. In this second alternative of FIG. 7B, only one R-PDCCH is used to activate multiple SPS patterns, after all SPS pattern are configured by RRC signaling. For example, in FIG. 7B, when the last SPS RRC signaling is received, one R-PDCCH 760 is used to activate all SPS patterns. The relay node interprets the combined SPS pattern as the preserved resource for the uplink backhaul transmission. To enable this procedure, besides periodicity of each SPS pattern, an offset value (e.g., 780A-B) is signaled in RRC signaling. These offset values 780A-B determine the relative location of multiple SPS pattern.

Figure 8:
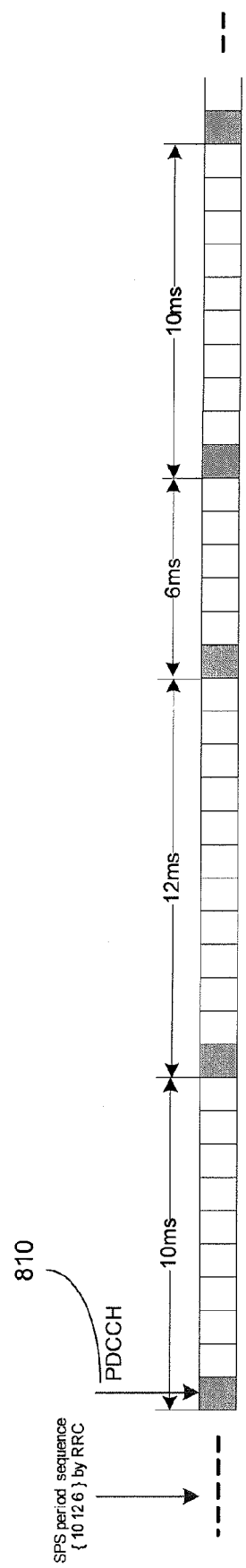
FIG. 8 depicts an example of multi-periodicity for SPS for the relay node.

In the case of the multi-periodicity SPS, multi-periodicity SPS is used to indicate uplink backhaul subframe configurations (e.g., of links 126A and 192B). In this second scheme, only one SPS pattern is configured for the relay node, but configured with multiple periodicities. The multiple periodicities for this SPS pattern will be signaled to the relay node by the DeNB via RRC signaling. Moreover, one R-PDCCH 810 is used to activate the multi-periodicity SPS pattern. The relay node then interprets the multi-periodicity SPS pattern as the preserved resource for uplink backhaul transmission. FIG. 8 depicts an example of multi-periodicity for SPS for the relay node. Multiple periodicity generally refers to an interval for reserved resources that has multiple values, as in the case of FIG. 8 in which the intervals are 10 ms, 12 ms, 6 ms, etc. In Rel 8, this interval is typically always one value (for frequency division duplex) or two values (for some time division duplex configurations.)

To flexibly identify the uplink backhaul subframe configuration, bitmap signaling for the uplink backhaul subframe configuration (e.g., links 126A and 192B) may be implemented as well. The bitmap signaling is based on the downlink backhaul subframe configuration, so that the bitmap represents the possible location(s) of the downlink backhaul subframe. The bitmap is used instead of a typical subframe index that is used in connection with the MBSFN configuration. Moreover, bitmap signaling may be sent via RRC signaling or MAC CE and carried by R-PDSCH.

TABLE 1

Bitmap signaling design example for uplink backhaul resource allocation Bitmap Signaling:

UL Backhaul Configuration bits (24 bits): bitmap to DL backhaul subframe; 0 means no corresponding UL backhaul subframe is configured for the mapped DL backhaul subframe; 1 means there is corresponding UL backhaul subframe for mapped DL backhaul subframe; max mapped to 24 DL backhaul subframe; and Periodicity bits (5 bits): counted by DL backhaul subframe number; max periodicity is 24 DL backhaul subframe; These bits indicate how many bits in "UL backhaul configuration bits" are useful; for example, if periodicity bits indicate 20, then only the first 20 bits in "UL backhaul configuration bits" are useful.

The bitmap indicating the subframe configuration of the uplink backhaul may thus map the locations allocated to the uplink backhaul as well as the downlink backhaul. Bitmap signaling may, based on the implementation, support asymmetric allocation and multiple sets of uplink backhaul subframe configurations.

Figure 9:
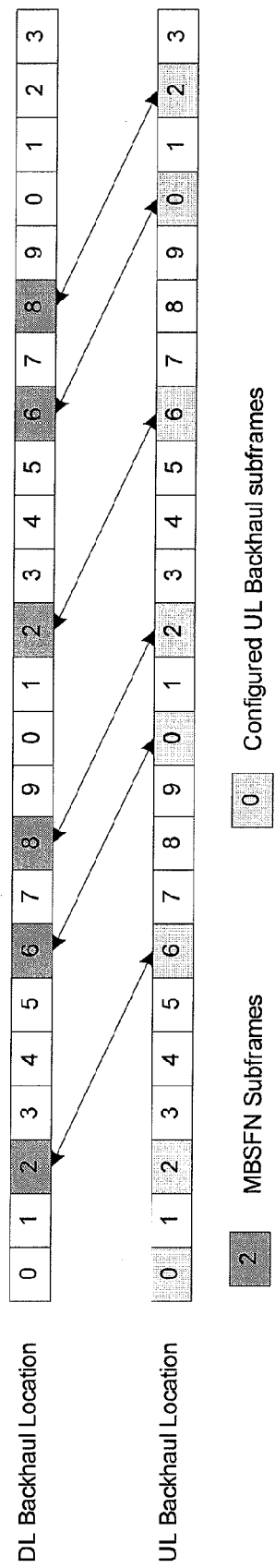
FIG. 9 depicts an example of backhaul subframe configurations indicated using a bitmap.

FIG. 9 depicts an example for downlink subframe configuration given the downlink backhaul subframe configuration is frequency division duplexed and given the uplink backhaul indication is as follows:

UL Backhaul Configuration bits (24 bits): 010101000001000000000000

Periodicity bits (5 bits): 01100.

Periodicity bits indicate the period is 12 downlink backhaul subframes, so that only the first 12 bits of the bitmap are valid (which is 010101000001). FIG. 9 also depicts what the uplink backhaul subframe location will be for the uplink. In the uplink backhaul configuration bits, each bit stands for one uplink subframe location that corresponds to one MBSFN subframe (e.g., when the uplink subframe is in subframe number n, then corresponding MBSFN subframe is in subframe number (n−4)). Because in 40 ms, there are typically at most a maximum of 24 MBSFN subframes, there should be 24 bits for the signaling. If the bit is "1," then the uplink location is configured as an uplink backhaul subframe, and if the bit is "0," then the uplink location is not configured for uplink backhaul. The periodicity bits thus indicate valid bits number in uplink backhaul configuration bits (e.g., if the periodicity bits are 01100, then the valid bits number is 12). The first 12 bits in uplink backhaul configuration bits are valid, and now the valid uplink backhaul configuration bits have 12 bits, and the relay node will only use these 12 bits to configure the uplink backhaul subframe. In typical use cases, the number of downlink backhaul subframes should be always larger than or equal to the number of uplink backhaul subframes, so this bitmap related to downlink backhaul allocation is sufficient for uplink backhaul configurations.

Figure 10:
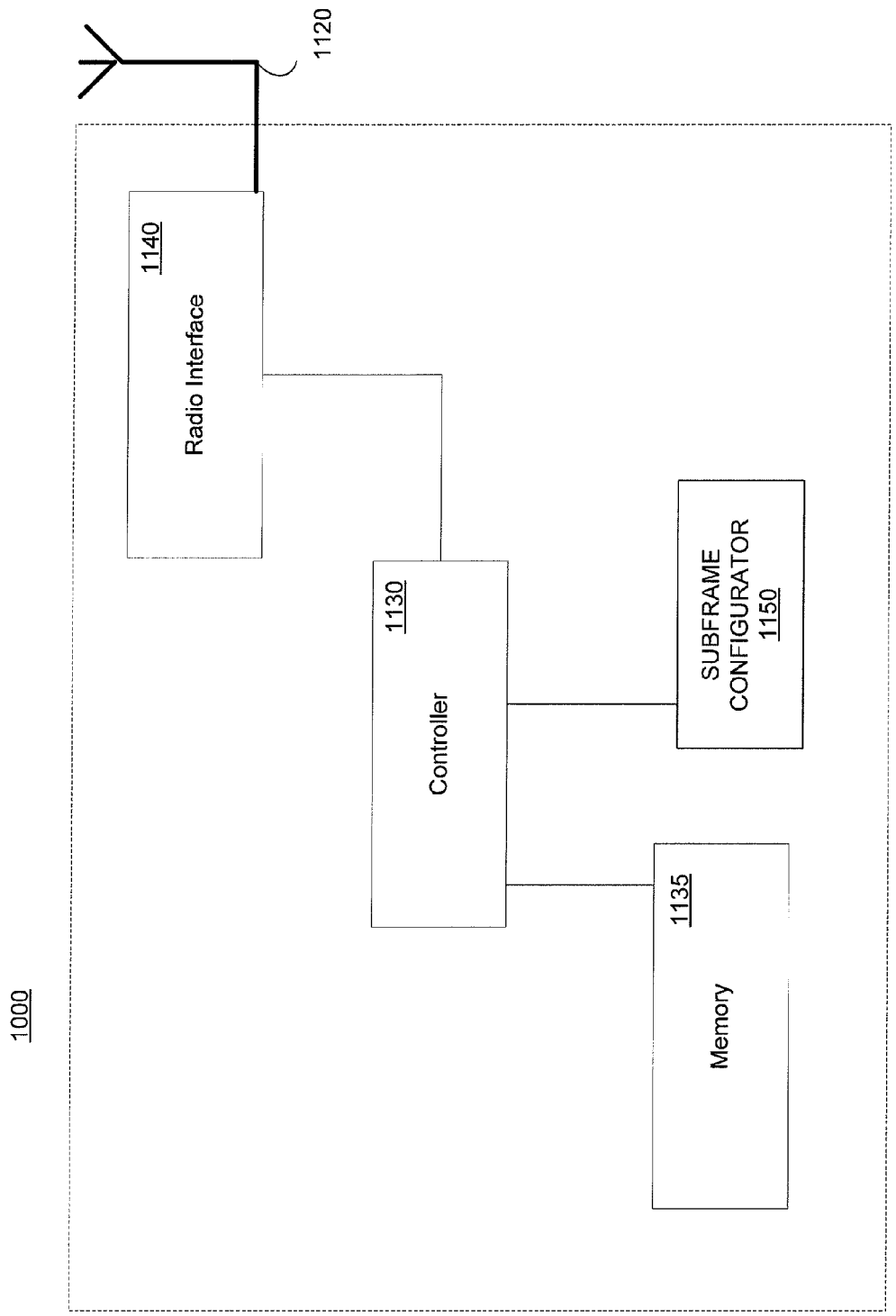
FIG. 10 depicts a base station configurable to operate as at least one of a donor evolved node B base station or a relay node.

FIG. 10 depicts an example implementation of a base station 1000, which may be implemented at base stations 110A-C. The base station includes an antenna 1120 configured to transmit via a downlink and configured to receive uplinks via the antenna(s) 1120. The base stations 110A-B further includes a radio interface 1140 coupled to the antenna 1120, a processor 1130 for controlling the base station 1100 and for accessing and executing program code stored in memory 1135. The radio interface 1140 further includes other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station is also compatible with IEEE 802.16, LTE, LTE-Advanced, and the like, and the RF signals of downlinks and uplinks are configured as an OFDMA signal. The base station 110A-C may include a subframe configurator 1150. The subframe configurator 1150 may send and/or receive information regarding the subframe configuration of the backhaul uplinks and or downlinks, as described herein.

Figure 11:
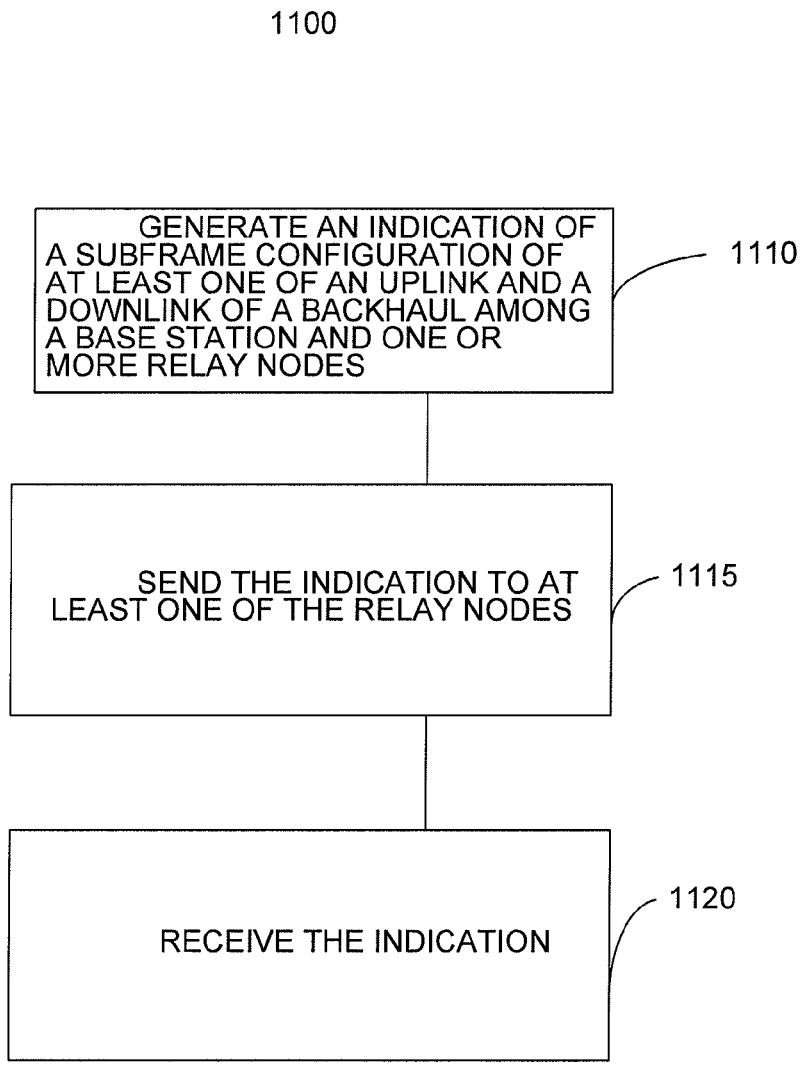
FIG. 11 depicts a process implemented by a base station to indicate the subframe configuration of the backhaul (e.g., the uplink and/or downlink subframe configuration). Like labels are used to refer to same or similar items in the drawings.

FIG. 11 depicts a process 1100 used by a base station configured with the subframe configurator 1150.

At 1110, an indication is generated. The indication may provide information to a relay node regarding the configuration of the subframes of the uplink and/or the downlink. The indication may be generated using one or more of the implementations described herein, such as relay common signaling, relay specific signaling, group-based signaling, multiple semi-persistent scheduling, multi-periodicity SPS, and/or a bitmap. Moreover, the indication may be determined, such that the downlink backhaul links 120 and 198 share a band with the relay access links 122 and 196 (e.g., time division duplexed).

At 1115, the generated indication is sent to a relay node. For example, the subframe configurator 1150 at DeNB 110B may send the indication, which is received by one or more relay nodes, such as relay nodes 110A and 110C.

At 1120, the indication is received at a relay node. For example, the relay node may also include a subframe configurator (e.g., subframe configurator 1150), which receives the indication. The subframe configurator at the relay node may thus control when the relay node transmits on the uplink (e.g., links 126A and 192B) and/or downlink (e.g., links 116A and 192A) of a backhaul. Moreover, the transmission may share a band with the relay access links 122 and 196 using time division duplex.

The subject matter described herein may be embodied in systems, apparatus, methods, and/or articles depending on the desired configuration. For example, the base stations and user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   generating, for a relay node, an indication of a configuration of a subframe of at least one of an uplink and a downlink of a backhaul; and
   sending the indication to the relay node to configure transmission at the relay node in accordance with the configuration of the subframe, wherein the indication is generated using multi-periodicity semi-persistent scheduling, wherein the relay node is coupled to a base station transmitting the indication, and wherein the backhaul and an access link from the relay node are configured for time division multiplex communications.

2. The method of claim 1, wherein the generating further comprises:
   generating the indication as a common signal transmitted to a plurality of relay nodes coupled to the base station.

3. The method of claim 1, wherein the generating further comprises:
   generating the indication as a signal transmitted specifically to the relay node.

4. The method of claim 1, wherein the generating further comprises:
   establishing a group of a plurality of relay nodes coupled to the base station, and the indication generated as a group-based signal transmitted to the plurality of relay nodes that belong to a same group.

5. The method of claim 1, wherein the generating further comprises:
   generating the indication using a bitmap.

6. An apparatus comprising:
   at least one processor circuitry;
   at least one memory circuitry, the at least one memory circuitry and the computer program code configured to, with the at least one processor circuitry, cause the apparatus to perform at least the following:
   generate, for a relay node, an indication of a configuration of a subframe of at least one of an uplink and a downlink of a backhaul; and
   send the indication to the relay node to configure transmission at the relay node in accordance with the configuration of the subframe, wherein the indication is generated using multi-periodicity semi-persistent scheduling, wherein the relay node is coupled to a base station transmitting the indication, and wherein the backhaul and an access link from the relay node are configured for time division multiplex communications.

7. The apparatus of claim 6, wherein the apparatus is further configured to at least:
   generate the indication as a common signal transmitted to a plurality of relay nodes coupled to the base station.

8. The apparatus of claim 6, wherein the apparatus is further configured to at least:
   generate the indication as a signal transmitted specifically to the relay node.

9. The apparatus of claim 6, wherein the apparatus is further configured to at least:
   establish a group of a plurality of relay nodes coupled to the base station, and the indication generated as a group-based signal transmitted to the plurality of relay nodes that belong to a same group.

10. The apparatus of claim 6, wherein the apparatus is further configured to at least:
    generate the indication using a bitmap.

11. A non-transitory computer-readable storage medium including code which when executed on at least one processor causes operations comprising:
    generating, for a relay node, an indication of a configuration of a subframe of at least one of an uplink and a downlink of a backhaul; and
    sending the indication to the relay node to configure transmission at the relay node in accordance with the configuration of the subframe, wherein generating the indication using multi-periodicity semi-persistent scheduling, wherein the relay node is coupled to a base station transmitting the indication, and wherein the backhaul and an access link from the relay node configured for time division multiplex communications.

12. The non-transitory computer-readable storage medium of claim 11, wherein the generating further comprises:
    generating the indication as a common signal transmitted to a plurality of relay nodes coupled to the base station.

13. The non-transitory computer-readable storage medium of claim 11, wherein the generating further comprises:
    generating the indication as a signal transmitted specifically to the relay node.

14. The non-transitory computer-readable storage medium of claim 11, wherein the generating further comprises:
    establishing a group of a plurality of relay nodes coupled to the base station, and the indication generated as a group-based signal transmitted to the plurality of relay nodes that belong to a same group.

15. The non-transitory computer-readable storage medium of claim 11, wherein the generating further comprises:
    generating the indication using a bitmap.

16. The method of claim 1, wherein the indication is carried by radio resource control signaling.

* * * * *